United States Patent [19]
Meszko et al.

[11] Patent Number: 5,257,410
[45] Date of Patent: Oct. 26, 1993

[54] COMMUNICATION DEVICE WITH ISDN INTERFACE

[75] Inventors: William R. Meszko, Fort Worth; Graham G. Haddock, III, Bedford, both of Tex.

[73] Assignee: Motorola, Inc., Schaumburg, Ill.

[21] Appl. No.: 673,443

[22] Filed: Mar. 22, 1991

[51] Int. Cl.⁵ .......................... H04B 1/44; H04B 1/38
[52] U.S. Cl. ........................................ 455/78; 455/89; 455/127; 379/58
[58] Field of Search ............... 455/78, 89, 68, 127, 455/343; 379/58

[56] References Cited

U.S. PATENT DOCUMENTS

| | | | |
|---|---|---|---|
| 4,147,984 | 4/1979 | Caudel et al. | 455/38 |
| 4,637,022 | 1/1987 | Burke et al. | 371/37 |
| 4,684,941 | 8/1987 | Smith et al. | 340/825.52 |
| 4,884,287 | 11/1989 | Jones et al. | 455/343 |
| 4,916,724 | 4/1990 | Usui | 379/58 |
| 5,117,219 | 5/1992 | Tice et al. | 340/506 |

OTHER PUBLICATIONS

Motorola Telecommunications Device Data Book, pp. 2-477 to 2-518, Advanced Information-ISDN Universal Digital Loop Transceivers II (UDLT II) Motorola, Inc. 1989.

Primary Examiner—Reinhard J. Eisenzopf
Assistant Examiner—Christine K. Belzer
Attorney, Agent, or Firm—M. Mansour Ghomeshi

[57] ABSTRACT

Briefly, according to the invention, a multi-unit communication device having a transceiver unit 108 and a control unit 104 is provided. The transceiver unit 108 transmits and receives information signals having digital and analog portions. The control unit 104 provides for operator interface to the communication device. The communication between the transceiver unit 108 and the control unit 104 is conducted on a single pair of wires 112 using ISDN format.

12 Claims, 2 Drawing Sheets

COMMUNICATION DEVICE WITH ISDN INTERFACE

TECHNICAL FIELD

This invention relates generally to radios and more particularly to radios having more than one functioning unit.

BACKGROUND

Many voice and data communication devices particularly those used in mobile applications, operate using multiple units. One of these units is generally used for operator interface. Functions controlled by these units are channel selection, volume control, microphone and speaker connections, etc. A second unit, remotely located, is used to handle the transmission and reception of radio frequency signals. The connection between the two units has traditionally been provided by multi-wire cables. These cables are generally complex and have many different types of inner wires for handling various signal types namely; audio and digital signals. Additionally, these cables are expensive and unreliable.

In the past many attempts have been made to reduce the number of wires used in these cables. One such reduction has been the use of a limited number of wires to handle all the commands entered by the operator by serially placing those commands of these wires. In U.S. Pat. No. 4,147,984 to Caudel et al. discloses a dual digital processor radio signal transmitter having two units coupled to each other via a pair of wires. The communication device in his claims communicates the selection of a key from one unit to another digitally and serially. The voice communication is either not provided for or is carried by a second pair of wires. Other methods are available for communications between register-modeled radio devices using data packets with reduced number of wires (U.S. Pat. Nos. 4,637,022 and 4,684,941). Neither of these methods provide for voice communications. It is therefore clear that a need exists for a communication device having multi-units coupled to each other via a single pair of wires and being able to simultaneously process voice and digital information between its multi-units.

SUMMARY OF THE INVENTION

Briefly, according to the invention, a multi-unit communication device having a transceiver unit and a control unit is provided. The transceiver unit transmits and receives information signals having digital and analog portions. The control unit provides for the operator interface to the communication device. The communication between the transceiver unit and the control unit is conducted on a single pair of wires using ISDN format.

DETAILED DESCRIPTION OF THE PREFERRED EMBODIMENT

Figure 1:
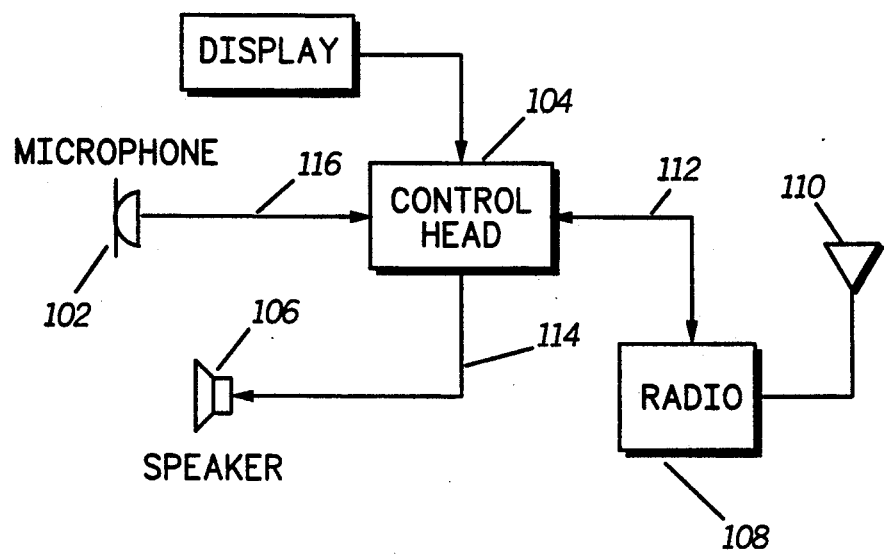
FIG. 1 is a block diagram of a multi-unit communication device in accordance with the principles of the present invention.

Referring to FIG. 1, a block diagram of a communication device is shown in accordance with the present invention. The communication device comprises a first unit, radio 108 and a second unit, radio control head 104, coupled together via a single pair of wires 112. The radio unit 108 and the control head 104 may be register modeled containing processors for being addressed by various other components that may be added to the communication device. The communication device further includes a microphone 102, a speaker 106, and a display unit 120 coupled to the control head 104 via signal lines 116, 114, and 112, respectively. Communications to and from the device 100 is accomplished via an antenna 110 connected to the radio 108. In most mobile applications, the radio control head 104 is placed within reach of the vehicle driver while the radio 108 is placed remotely in the trunk. The cable 112 provides simultaneous audio and digital communication between the two units 108 and 104 and is effectively the only link between them. Not shown are power supply connections that are available at both the radio 108 and the control head 104. A radio frequency carrier signal available at the antenna 110 is routed to the radio 108 where it is received and demodulated. The demodulated signal from the radio 108 is sent to the control head 104 for presentation to the user. The presentation to the user may be in the form of audio on the speaker 106 and/or display information on the display 120. The speaker 106 may include an amplifier so as not to depend on the control head 104 for audio amplification.

Figure 2:
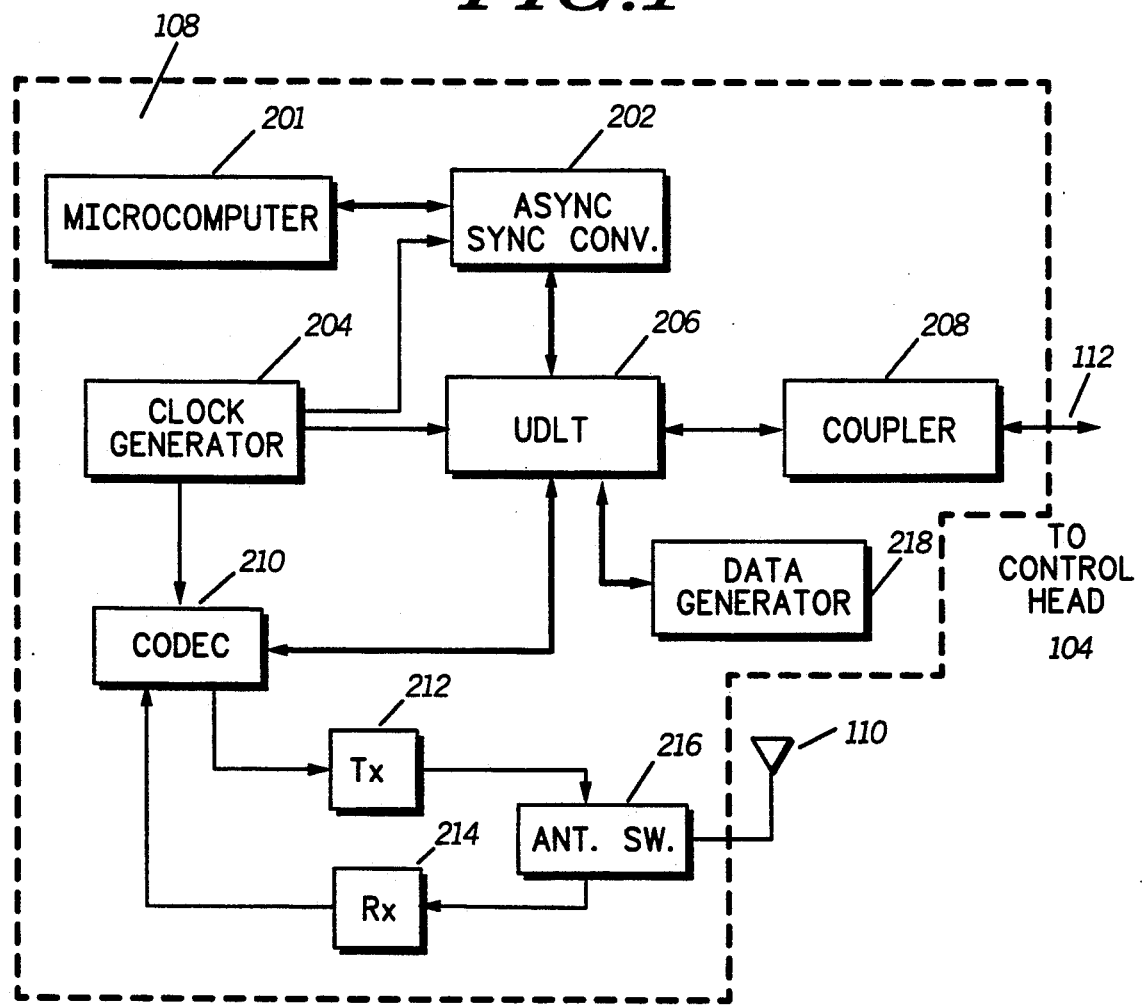
FIG. 2 is a block diagram of the elements of one of the units of the communication device of FIG. 1.

Referring to FIG. 2 now, the elements of the radio 108 are shown in accordance with the present invention. The radio 108 is preferably a mobile radio. A radio frequency carrier signal received at the antenna 110 is coupled to a receiver 214 via an antenna switch 216. The antenna switch 216 switches between the receiver 214 and a transmitter 212 depending on the mode of operation of the radio 108. The combination of the receiver 214, the transmitter 212, and the antenna switch 216 form a transceiver in the radio unit 108. The receiver 214 receives the carrier signal and recovers the information signal modulating it. This information signal typically contains voice signals. The analog output signal of the receiver 214 is coupled to a Coder/Decoder (CODEC) 210. The function of the CODEC 210 is to provide analog-to-digital (A/D) and digital-to-analog (D/A) conversion. The CODEC 210 is bi-directionaly connected to an Universal Digital Loop Transceiver (UDLT) 206. The UDLT 206 is also connected to an Async. to Sync. converter 202, a clock generator 204 and a coupler 208. The Async. to Sync. converter 202 is used as a coupler between the UDLT 206 and a microcomputer 201. The clock generator 204 also provides clock signals to the converter 202 and the CODEC 210. As it will become evident, clock signals are utilized in the proper operation of the radio 108. The UDLT 206 is coupled to the single pair of wires 112 via the coupler 208. The single pair of wires 112 may be a twisted pair of wires or a coaxial cable. A second source of synchronous data, data generator 218 may be connected to the UDLT 206 as an option.

The microcomputer 201 controls the overall operation of the communication device. The converter 202 can be included the microcomputer 201 as the signal from the microcomputer 201 can be synchronized. It is necessary that the digital input to the UDLT 206 be synchronized and that is exactly what the converter 202 accomplishes. The converter 202 is clocked under the command of the UDLT 206. In fact the converter 202 generates one bit when clocked by the UDLT 206.

The information signal at the output of the receiver 214 is coupled to the CODEC 210 where it is digitized by the onboard A/D converter. The digitized voice is buffered and packeted in 8 bit bursts. The UDLT 206 clocks (via the clock generator 204) the CODEC 210 for the eight bit packet and then clocks the converter 202 and the generator 218 for a single bit of data from each at a rate of 8 KBPS (Kilo Bits Per Second). This results in the transfer of digitized voice from CODEC 210 at a rate 64 KBPS and and data at a rate of 8 KBPS from each of the converter 202 and the generator 218. UDLT 206 includes a first processor means that converts the 8 bits of digitized voice with the two separate one bits from the converter 202 and the data generator 218 to produce a 10 bit packet having ISDN format. The ISDN formatted signal of UDLT 206 is coupled to a coupler 208 for simultaneous transmission to the control head 104 via wires 112. This method is often referred to as B+2C as it contains two 8 KBPS full duplex and one 64 KBPS full duplex data channels.

In the transmit mode, an ISDN formatted signal with 10 bit packets having data and voice portions generated by the control head 104 and carried by the wires 112 is received by the UDLT 206 via the coupler 208. The UDLT 206 partitions the 10 bit packets into an 8 bit word and 2 one-bit words. The 8 bit words is clocked into the CODEC 210. One of the one bit words is clocked into the converter 202. The converter 202 asynchronizes the one bit data and routes them to the microcomputer 201. These signals are generally command signals and are routed to the microcomputer 201 for execution. The CODEC 210 processes its 8 bit packet to ⅛ millisecond of analog voice and therefore reconstructs the analog signal. The reconstructed voice signal is coupled to the transmitter 212 for transmission. The transmitter 212 includes a modulator to modulate a carrier signal using the reconstructed voice signal. The modulated carrier signal is then coupled to the antenna 110 via the antenna switch 216. The antenna switch 216 is directed by the microcomputer 201 to couple the output of the transmitter 212 to the antenna 110. Once again, the clock generator 204 coordinates the timing between the various components in the transmit mode under the direction of the UDLT 206. Transmission of data signals generated by either the control head 104 or the microcomputer 201 can be handled by the UDLT 206. A separate path is needed between the UDLT 206 and the transmitter 212 for the data portions of the signal to be transmitted. This is necessary to bypass the CODEC 210 for no analog to digital conversion is needed. The coupler 208 contains transformer circuits that enable DC and potentially other low frequency control signals to share the wires 112 with the data that the control head 104 and the radio 108 ping pong back and forth. The DC signal is normally generated by the radio 108 and placed on the wires 112 so as to power up the control head 104. The addition of DC power to the ISDN formatted signals on wires 112 is significant for the need for additional cables to provide DC power to the control head 104 is eliminated rendering the cabling even simpler.

To summarize, the receiver 214 receives a signal via the antenna 110 and the antenna switch 216. The demodulated signal of the receiver 214 is converted to digital by the CODEC 210 and passed on to the UDLT 206 which receives data from the microcomputer 201 via the converter 202. The UDLT 206 combines and formats the incoming signals from the CODEC 210 and the converter 202 to ISDN format and prepares them for transmission on the single pair of wires 112 via the coupler 208. The coupler 208 also couples DC operating current from the radio 108 to the control head 104 on the single pair of wires 112. In the transmit mode, signals containing digital voice and having ISDN format are received by the UDLT 206 via the coupler 208 and the wires 112. The UDLT 206 de-formats the ISDN signals and couples the data portions intended for the microcomputer 201 to the converter 202. The voice portions intended for transmission are coupled to the CODEC 210. The CODEC 210 converts the digitized voice to analog and couples them to the transmitter 212 where they are transmitted via the antenna 110 through the antenna switch 216.

Figure 3:
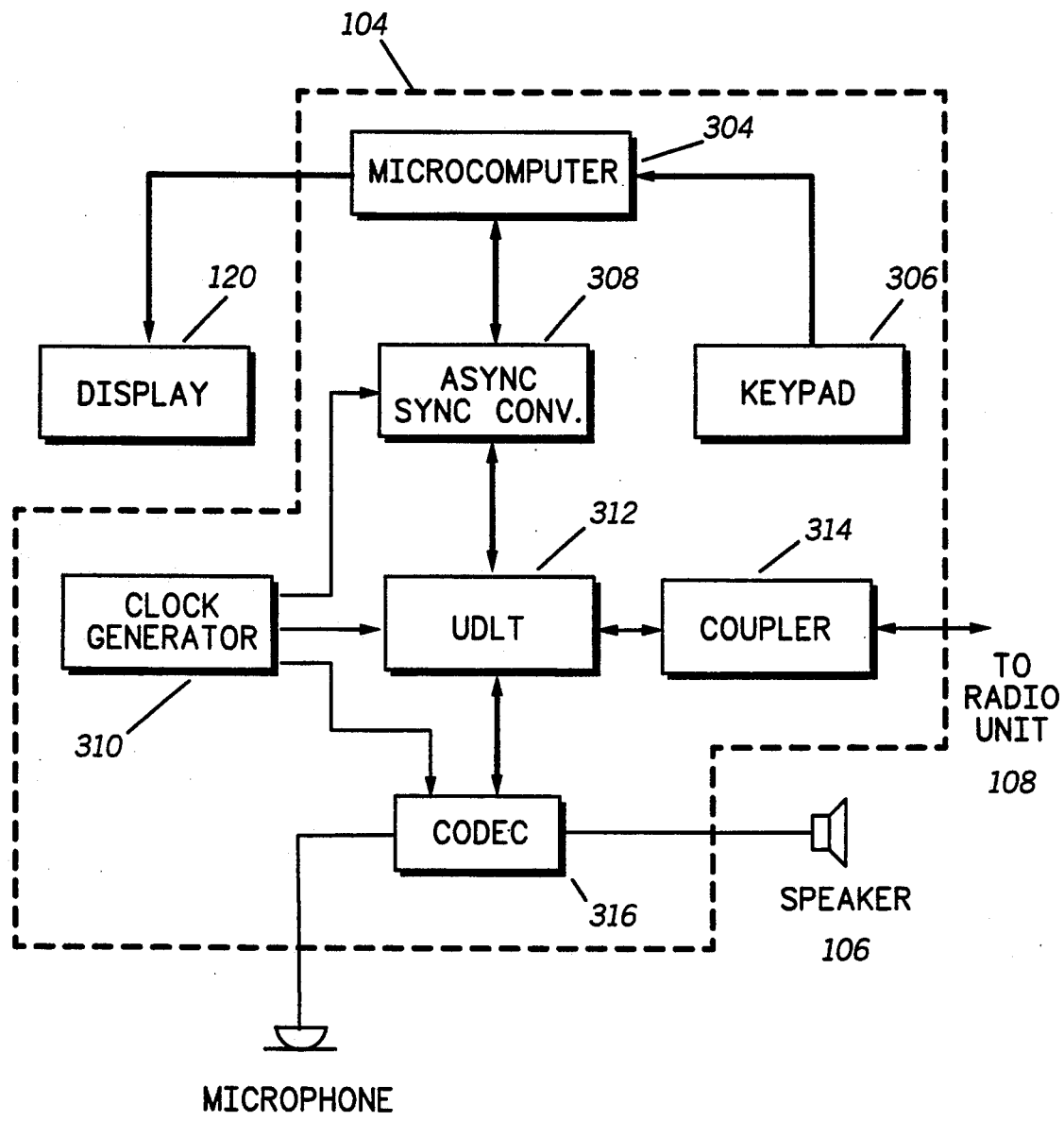
FIG. 3 is a block diagram of the elements of a second unit of the communication device of FIG. 1.

Referring to FIG. 3 now, the block diagram of the internal components of the control head 104 is shown in accordance with the present invention. The control head 104 is preferably a mobile radio control head. The incoming ISDN formatted signal on wires 112 is coupled to an UDLT 312 via a coupler 314. The UDLT 312 includes a second processor for receiving the ISDN format signal and de-formating it back to digital. The UDLT 312 also separates the digitized voice components of the signal from the data signals. The digitized voice portion of the signal is coupled to a CODEC 316 where it is decoded and converted back to analog and presented to the user on an audio output device such as the speaker 106. The data portion of the signal is coupled to a microcomputer 304 after being asynchronized by an Async. to Sync. converter 308. The microcomputer 304 processes the data and presents it on a display 120 as necessary.

In some applications the control head 104 contains circuits that replace the microcomputer 304. In these control heads, special hardware is used to provide the functions of the microcomputer 304 without the need for a second processor.

A keyboard 306 connected to the microcomputer 304 is used to inform the radio 108 of the operator's requests and commands. Keyboard entries are processed by the microcomputer 304 and displayed on the display 120 for operator confirmation. The UDLT 308 receives the keyboard data and combines them with any voice that may have been generated by the microphone 102 and digitized by the CODEC 316. The combination of the voice and data is then formatted to ISDN and packeted accordingly. The data packets are placed on the wires 112 via the coupler 314. The coupler 314 contains transformer circuits that enable DC and potentially other low frequency control signals to share the wires 112 with the data that the UDLTs 206 and 312 ping pong back and forth.

The coupler 208 in the radio 108 receives the signal on the wires 112 and couples it to the UDLT 206. The UDLT 206 separates the contents of the data packets received and directs them to the appropriate locations. The voice portion is directed toward the CODEC 210 and the data portions to the microcomputer 201 via the Async. to Sync. converter 202. The microcomputer 201 evaluates the operator's requests and directs various elements of the radio 108 to that effect. If a radio transmission is desired the CODEC 210 converts the digitized voice to analog and couples it to the the transmitter 212. The transmitter 212 is directed by the microcomputer 201 to transmit this voice signal. Furthermore, the microcomputer 201 directs the antenna switch 216 to switch the antenna 110 to the output of the transmitter 212.

In summary, the operator's voice at the microphone 102 is digitized by the CODEC 316 and coupled to the UDLT 312. Data signals from the keyboard 306 are processed by the microcomputer 304 and coupled to the UDLT 312 via the converter 308. The microcomputer 304 displays the keyboard entries on the display 120 for operator confirmation. The UDLT combines and ISDN formats the data from the converter 308 and the digitized voice from the CODEC 316. The digital signal of the UDLT 312 is coupled to the single pair of wires 112 via the coupler 314.

The operation of the elements of the radio 108 are well known in the art. The integrated circuits used in the radio 108 and the control head 104 to perform the functions of the UDLT 206 and 312, CODEC 210 and 316, and the Async. to Sync. converter 202 and 308 are standard telephone interconnect chip set. This chip set contains MC145426, MC145428, MC14402, MC14403, and MC145422 manufactured by Motorola. For more details on the operation of this chip set refer to the Motorola Telecommunications devices data book and applications note AN943 which are incorporated herein by reference.

The use of ISDN format to communicate control data and information signals between the various components of a communication device results in a substantial improvement in the quality and cost of such communication devices. A major benefit of ISDN is its cable requirements. A single pair of wires such as a standard telephone cable can be used to carry the entire communication, both voice and data which includes control and command data, between the various components of the communication device. This single cable replaces a multi-wire custom made cable that is used in existing devices. The standardization and simplification of this cable results in significant cost reductions and quality improvements.

What is claimed is:

1. A communication device for receiving a carrier signal modulated with an information signal comprising a voice signal, the device having a plurality of units interconnected via a single pair of wires for communicating information signals and control data signals and comprising:
    (a) a first unit including;
        (i) receiver means for receiving the carrier signal and recovering the information signal;
        (ii) digitizer means for digitizing the voice signal of the recovered information signal;
        (iii) first processor means for encoding the digitized voice signal and the control data signals to ISDN format; and
        (iv) means for simultaneously coupling the ISDN formatted signal to the single pair of wires, the means for simultaneously coupling includes means for carrying DC current from the first unit to power the second unit;
    (b) a second unit, including;
        (i) second processor means for receiving the ISDN formatted signal from the single pair of wires;
        (ii) decoder means for decoding the digitized voice signal, and the control data signals of the ISDN formatted signal; and
        (iii) audio output means for outputting the voice signal;
    (c) display means coupled to the second unit for displaying the decoded data portions of the information signal.

2. The communication device of claim 1, wherein the first unit comprises a mobile radio receiver.

3. The communication device of claim 1, wherein the second unit comprises a mobile radio control head.

4. The communication device of claim 1, wherein the audio output means comprises a speaker coupled to the second unit.

5. The communication device of claim 1, wherein the audio output means comprises a head phone.

6. The communication device of claim 1, wherein the single pair of wires comprises a twisted pair.

7. The communication device of claim 1, wherein the single pair of wires comprises a coaxial cable.

8. The communication device of claim 1, wherein the first processor means comprises standard telephone ISDN chip set.

9. A radio having at least two functional units communicating to each other via a single pair of wires, the radio comprising:
    (a) a control unit for controlling the operation of the radio and processing operator's commands and voice signals, the control unit including:
        (i) first means for accepting operator's commands and voice signals;
        (ii) second means coupled to the first means for digitizing operator's voice signal;
        (iii) converter means for converting operator's commands and digitized voice signals to ISDN format;
        (iv) means for simultaneously coupling ISDN formatted digitized voice and operator's commands to the first end of the single pair of wires, the means for simultaneously coupling includes means for carrying DC current from the first unit to power the second unit; and
    (b) a radio transmitter coupled to the second end of the single pair of wires for receiving the ISDN formatted signal from the control unit, the radio transmitter comprising:
        (i) processor means for processing the ISDN formatted commands from the control unit;
        (ii) converter means for converting digitized operator's voice to analog;
        (ii) transmitter means for transmitting operator's voice.

10. The radio of claim 9, wherein the first means comprises a keyboard.

11. The radio of claim 9, wherein the first means comprises a microphone.

12. The radio of claim 9, wherein the transmitter means include means for transmitting digital information.

* * * * *